Figure 1:
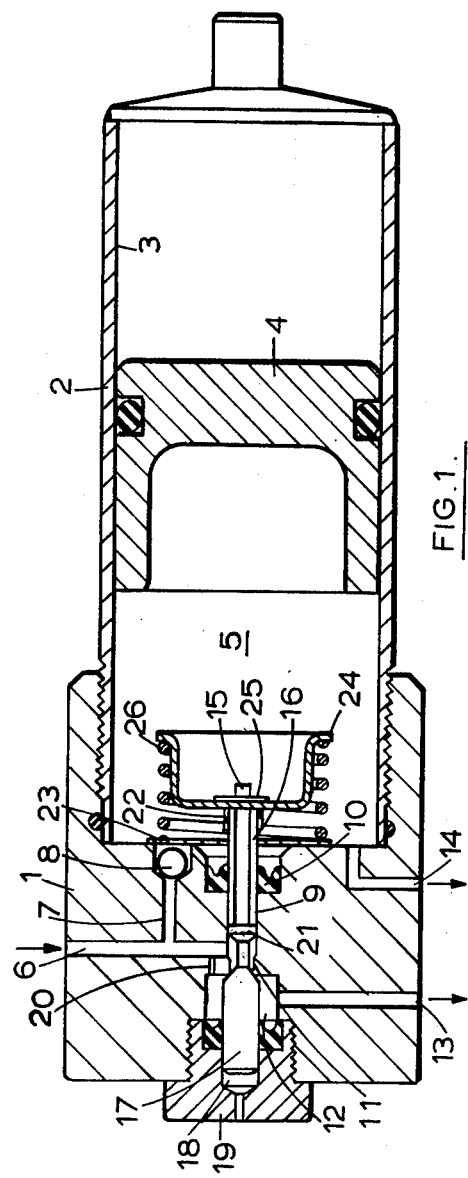

United States Patent [19]

Taft

[11] 4,076,036

[45] Feb. 28, 1978

[54] HYDRAULIC FLOW CONTROL VALVE ASSEMBLIES

[75] Inventor: Philip Augustus Taft, Solihull, England

[73] Assignee: Girling Limited, Birmingham, England

[21] Appl. No.: 463,612

[22] Filed: Apr. 24, 1974

[30] Foreign Application Priority Data

Apr. 24, 1973 United Kingdom ............ 19461/73

[51] Int. Cl.² .......................................... G05D 11/00
[52] U.S. Cl. .................................. 137/118; 60/418; 137/119
[58] Field of Search .................. 137/115, 118, 119; 60/413, 418, 420; 91/412; 138/31

[56] References Cited

U.S. PATENT DOCUMENTS

| 2,828,760 | 4/1958 | Taylor et al. | 138/31 |
| 2,846,850 | 8/1958 | Hall | 137/118 |
| 3,575,192 | 4/1971 | MacDuff | 137/118 |
| 3,692,039 | 9/1972 | Ewald et al. | 137/118 |
| 3,834,162 | 9/1974 | Keady | 137/118 |

Primary Examiner—Martin P. Schwadron
Assistant Examiner—G. L. Walton
Attorney, Agent, or Firm—Scrivener, Parker, Scrivener and Clarke

[57] ABSTRACT

A control valve assembly for use in a pump-operated vehicle hydraulic braking system as disclosed in which the output from the pump flows through the control valve, which selectively directs the output to steering gear of the vehicle or to an accumulator for connection to brakes. The valve is also provided with a bleed passage through which a proportion of the output is continuously supplied to the steering gear.

9 Claims, 2 Drawing Figures

HYDRAULIC FLOW CONTROL VALVE ASSEMBLIES

This invention relates to control valve assemblies for use in vehicle hydraulic systems, the assemblies being of the kind in which a housing includes an inlet passage for connection to a pump, a first outlet passage for connection to an hydraulic accumulator and a braking circuit, a non-return valve between the inlet passage and the first outlet passage, a second outlet passage for connection to a steering circuit, and a second valve responsive to the pressure in the first outlet passage for controlling communication between the inlet passage and the second outlet passage.

In a known valve assembly of this kind a restriction to fluid flow is located between the inlet passage and the non-return valve so that only a small proportion of the total pump output is available to charge the accumulator.

According to the present invention in a valve assembly of the kind set forth a bleed passage connects the inlet passage with the second outlet passage.

Thus the major proportion of the pump output is available to charge the accumulator so that the charging operation is quicker and the pump has less work to do which extends the life of the pump.

Conveniently the valve assembly also includes the accumulator, a cylinder bore extending between the storage chamber of the accumulator and an outlet chamber, and a piston working in the bore with a reduced diameter stem extending towards the outlet chamber to operate the second valve which is located in the outlet chamber, the arrangement being such that the inlet passage leads into the bore between the piston and the second valve and the second outlet passage leads into the outlet chamber.

Preferably the second valve co-operates with a seating at the end of the bore and is rigidly connected to the stem. The second valve may be sealed in the outlet chamber so that pressure in the outlet chamber acts to open the valve.

Preferably the second valve is sealed in a sleeve which is sealed in the outlet chamber, the sleeve being spring-biassed towards the valve seating, the arrangement being such that pressure in the outlet chamber acting on the sleeve tends to hold the second valve open provided the pressure overcomes the force of the spring.

The seating area of the second valve may be less that the area of the piston exposed to pressure in the inlet passage. The full area of the second valve may be greater than the area of the piston exposed to the pressure in the inlet passage.

Figure 2:
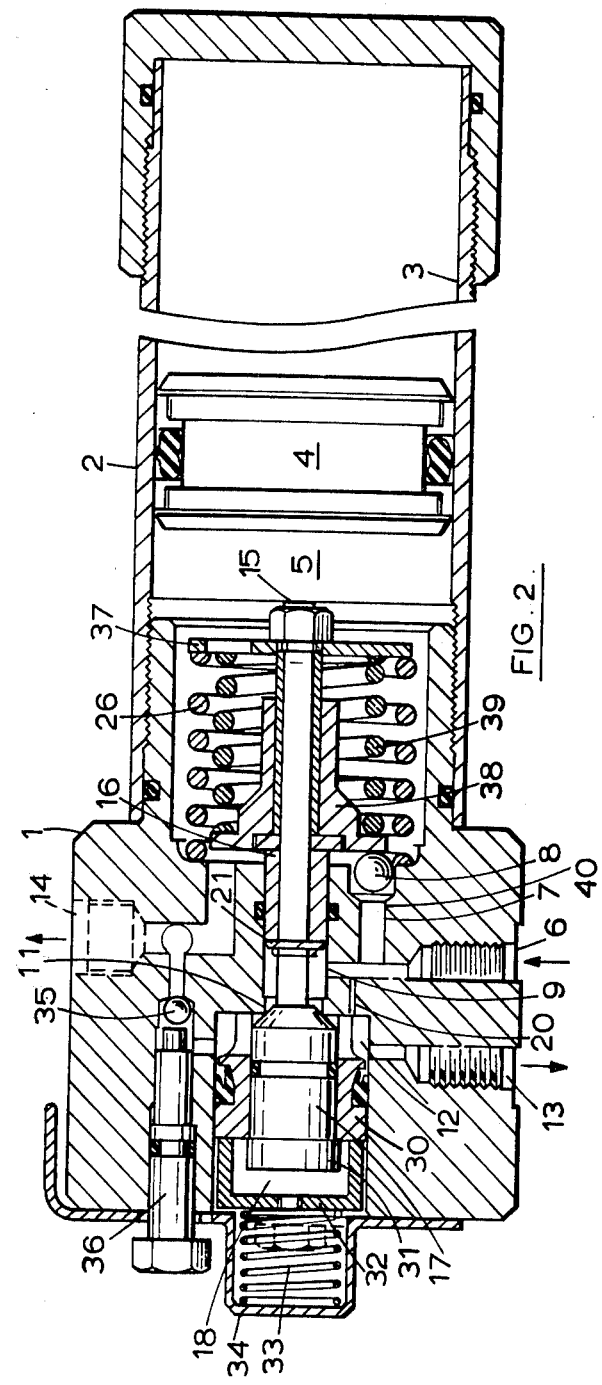

Two embodiments of valve assemblies according to this invention are illustrated as examples in the accompanying drawings, in which FIG. 1 is a longitudinal section of a valve assembly including an hydraulic accumulator, and FIG. 2 is a longitudinal section of a second embodiment of the assembly.

The control valve assembly illustrated in FIG. 1 comprises a first housing 1 screwed and sealed to a second housing 2 having a cylindrical bore 3 in which works a piston 4 loaded on its outer end by gas pressure or other resilient means towards the first housing. The inner end of the piston 4 is recessed to form a pressure storage chamber 5 with the first housing 1.

The first housing 1 has a radial inlet passage 6 which is adapted to be connected to a high pressure pump. A passage 7 leads from the inlet passage 6 into the storage chamber 5 and is counterbored at its end to form a housing for a one-way ball valve 8 seating on the outer end of passage 7.

The inlet passage 6 leads into an axial bore 9 the inner end of which leads into the storage chamber 5 and is counterbored to form a housing for a seal 10. The outer end portion 11 of bore 9 is of reduced diameter which leads into an outlet chamber 12 adapted to be connected to vehicle power steering gear via outlet passage 13.

A second outlet passage 14 in housing 1 leads into the storage chamber 5 and is adapted to be connected to a vehicle braking circuit.

A piston working in the bore 9 comprises a stem 15 surrounded by a tube 16 which engages the seal 10. The outer end of the stem 15 carries a valve head 17 (the second valve) which is adapted to engage a seating at the end of bore portion 11. The outer end of the valve head 17 is sealed in a recess 18 formed in a plug 19 screwed into the housing 1 to close the outlet chamber 12. The recess 18 is vented to atmosphere. The full diameter of the valve head is greater than the diameter of bore 9. A bleed passage 20 connects the inlet passage 6 with the chamber 12. The bleed passage 20 ensures a constant supply of fluid for the steering mechanism even when valve 17 is shut. However the size of the passage 20 is such that charging of the accumulator chamber 5 has priority over the steering.

A shoulder 21 intermediate the ends of stem 15 engages the outer end of tube 16. The inner end of the tube 16 is sealed to the stem 15 by a rubber or plastic cup 22. A first spring retainer 23 in the form of an apertured plate is located in the storage chamber 5 and is a clearance fit over the tube 16. The spring retainer 23 also serves to retain ball valve 8 in the counterbore at the end of passage 7. A second spring retainer 24 of top hat shape is held onto the inner end of stem 15 by a clip 25 which serves to hold tube 16 against shoulder 21 on the stem 15. A spring 26 located between the two retainers biasses the stem inwardly to hold valve head 17 on its seating. During assembly the stem 15 is passed through the bore 9 from its outer end, the tube 16 fitted on the stem, the cup 22 fitted on the tube, the first spring retainer fitted over the tube, the first spring retainer fitted over the tube, and then the spring 26 and second spring retainer 24 held in position by clip 25.

In operation pressure fluid in the inlet passage 6 and the passage 7 opens the ball valve 8 to pressurise the storage chamber moving the piston 4 to the right. At the same time fluid bleeds into outlet chamber 12 via bleed passage 20. As the pressure builds up in the chamber 5, the pressure in the bore 9 and in the chamber 5 is the same. The area of the inner end of the stem 15 and the tube 16 together with the annular area of valve 17 presents a greater area to the pressure fluid than the annular area provided by the outer end of the tube 16 in the bore 9 and thus there is a force due to fluid pressure tending to open the second valve 17. The spring 26 is sufficiently strong to overcome this force and hold the valve shut.

As the pressure rises it reaches a predetermined value at which the fluid pressure force tending to open the valve 17 is balanced by the force of the spring 26 and as the pressure increases past the said predetermined value the valve opens to allow pressure fluid to pass to the steering gear. Immediately the valve opens the pressure in the bore 9 is relieved but the pressure in the chamber 5 is retained by the ball valve 8 which prevents any reverse flow from the chamber into the passage 6. A pressure difference is set up on opposite faces of the stem 15 and the tube 16 and there is a force acting on the stem and tube substantially greater than the force of spring 26 opposed thereto. Thus the valve 17 opens rapidly once the said predetermined pressure has been reached and the valve will be fully opened without the pressure rising to a valve substantially higher than the said predetermined pressure.

If a steering action is required, the back pressure from the steering gear will pressurize chamber 12. Since the area of valve head 17 is greater than the area of shoulder 21, the force tending to keep the valve open will increase.

If pressure fluid is drawn from the chamber 5 through the outlet passage 14 for braking, the pressure in the chamber 5 falls. When the pressure in the chamber 5 has fallen below a second predetermined value, the valve 17 closes again, and fluid delivered to the assembly will again be fed into the storage chamber 5. The closing pressure is less than the opening pressure because the seating area of the valve is less than the area of the piston exposed to pressure in bore 9.

The valve assembly of FIG. 2 is similar to the assembly of FIG. 1 and the same reference numerals have been used for equivalent features. The principal modification is that valve 17 is now sealed in a sleeve 30 which in turn is sealed in the outlet chamber 12. The valve has an enlarged head 31 which provides an abutment for sleeve 30 and the portion of the sleeve adjacent the valve seat is slotted to allow flow between the bore 9 and outlet passage 13. The sleeve is retained in the outlet chamber by a cap 32 acted upon by a spring 33 housed in a cover plate 34. Operation of the valve 17 is the same as before except when a steering requirement causes the pressure in the outlet chamber to rise. The sleeve will then only pick up the valve head 31 when the pressure rise is sufficient to overcome the force in spring 33. This then defines the outlet chamber pressure at which the valve operates. Thus the sleeve positively holds the valve open and safeguards the steering against any movement of the piston due to vibration or other cause. If there is a steering requirement when the valve is shut the back pressure from the steering gear acts to open the valve. If there is a steering is operated when the valve is shut the back pressure from the steering gear acts on the sleeve will tend to open the valve.

Above the outlet chamber 12 a hand operated relief valve 35 is provided between outlet passage 14 and outlet chamber 12. When the operating member 36 in unscrewed the pressure in the accumulator lifts ball 35 off its seat and is vented to reservoir through the steering circuit. This enables the valve assembly to be safely dismantled for servicing.

Furthermore the spring retainers 23 and 24 have been modified. Spring 26 now acts between the housing 1 and a plate 37 at the end of stem 15 and the non-return valve 8 is retained by a member 38 held in place by a separate concentric spring 39 also acting against plate 37. Operation of valve 17 moves valve plate 37 towards non-return valve 8 holding it against its seat 40. This prevents further flow of fluid into the accumulator.

I claim:

1. A control valve assembly for use in vehicle hydraulic systems, said assembly comprising a housing which includes an inlet passage for connection to a pump, a first outlet passage for connection to an hydraulic accumulator and a braking circuit, a non-return valve between said inlet passage and said first outlet passage, a second outlet passage for connection to a steering circuit, a bleed passage connecting said inlet passage with said second outlet passage, and a second valve responsive to the pressure in said first outlet passage for controlling communication between said inlet passage and said second outlet passage, wherein said housing also includes a cylinder bore, and a seating between said bore and said second outlet passage, one end of said bore communicating with said second outlet passage, a piston of constant diameter in sealing engagement with said bore, and a stem of a diameter smaller than that of said piston connected to and extending from said piston towards said second outlet passage, said second valve comprising a valve member integral with said stem and engagable with said seating, and said inlet passage leads into said bore between said piston and said valve member.

2. A valve assembly as in claim 1 which includes said accumulator having a storage chamber, and said cylinder bore extends between said storage chamber of said accumulator and an outlet chamber, said stem extends towards said outlet chamber to operate said second valve which is located in said outlet chamber, and said second outlet passage leads into said outlet chamber.

3. A valve assembly as in claim 2 in which a spring, biassing said piston in a direction to close said second valve, is located in said storage chamber of said accumulator.

4. A valve assembly as in claim 1 in which said valve member is sealed in said outlet chamber so that pressure in the outlet chamber acts to open said valve.

5. A valve assembly as in claim 4 in which said second valve is sealed in a sleeve which is sealed in said outlet chamber, the sleeve being biassed by a spring towards said valve seating, the arrangement being such that pressure in said outlet chamber acting on said sleeve tends to hold said second valve open provided the pressure overcomes the force of said spring.

6. A valve assembly as in claim 1 in which the area of said seating is less than the area of said piston exposed to pressure in said inlet passage.

7. A valve assembly as in claim 6 in which the full area of said second valve is greater than the area of said piston exposed to pressure in said inlet passage.

8. A valve assembly as in claim 1 in which said piston comprises a tube surrounding said stem.

9. A valve assembly as in claim 1 which incorporates a manually operable relief valve located between said first and second outlet passages.

* * * * *